United States Patent
Xia et al.

(10) Patent No.: US 7,751,680 B2
(45) Date of Patent: Jul. 6, 2010

(54) ENVIRONMENTALLY STABLE COMPONENT ASSEMBLY

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 17 days.

(21) Appl. No.: 11/860,279

(22) Filed: Sep. 24, 2007

(65) Prior Publication Data

US 2009/0080900 A1 Mar. 26, 2009

(51) Int. Cl.
*G02B 6/00* (2006.01)
(52) U.S. Cl. .................. 385/147; 385/134; 385/137; 385/138; 385/139
(58) Field of Classification Search ......... 385/134–140, 385/147
See application file for complete search history.

(56) References Cited

U.S. PATENT DOCUMENTS

| | | | | |
|---|---|---|---|---|
| 5,324,933 A * | 6/1994 | Berkcan | ........... | 250/227.23 |
| 5,773,756 A * | 6/1998 | DiTullio | ........... | 174/37 |
| 6,452,667 B1 * | 9/2002 | Fernald et al. | ........... | 356/73.1 |
| 6,529,669 B1 * | 3/2003 | Crespel | ........... | 385/135 |
| 6,744,965 B2 * | 6/2004 | Arab-Sadeghabadi et al. | ........... | 385/147 |
| 7,394,023 B2 * | 7/2008 | Rizzuto, Jr. | ........... | 174/92 |
| 2004/0264895 A1 * | 12/2004 | Holt et al. | ........... | 385/100 |
| 2006/0005983 A1 * | 1/2006 | Rizzuto, Jr. | ........... | 174/50 |
| 2006/0181838 A1 * | 8/2006 | Ely | ........... | 361/622 |
| 2006/0231279 A1 * | 10/2006 | Burke et al. | ........... | 174/50 |
| 2007/0103165 A1 * | 5/2007 | Gaston et al. | ........... | 324/510 |
| 2008/0131132 A1 * | 6/2008 | Solheid et al. | ........... | 398/117 |
| 2008/0226249 A1 * | 9/2008 | Franckx et al. | ........... | 385/135 |

\* cited by examiner

*Primary Examiner*—Charlie Peng
*Assistant Examiner*—Eric Wong

(57) ABSTRACT

Component assemblies and methods of making component assemblies are disclosed. An exemplary component assembly may generally include a capsule defining a cavity for receiving a component. The component assembly may additionally include at least one lead extending from the component and through the capsule to allow communication between the component and a network or device. The lead may generally define a sealed length within the capsule that is at least as great as a predetermined or expected intrusion distance of an external contaminant along the sealed length over an expected lifetime or service interval associated with the component encapsulated in the cavity.

27 Claims, 6 Drawing Sheets

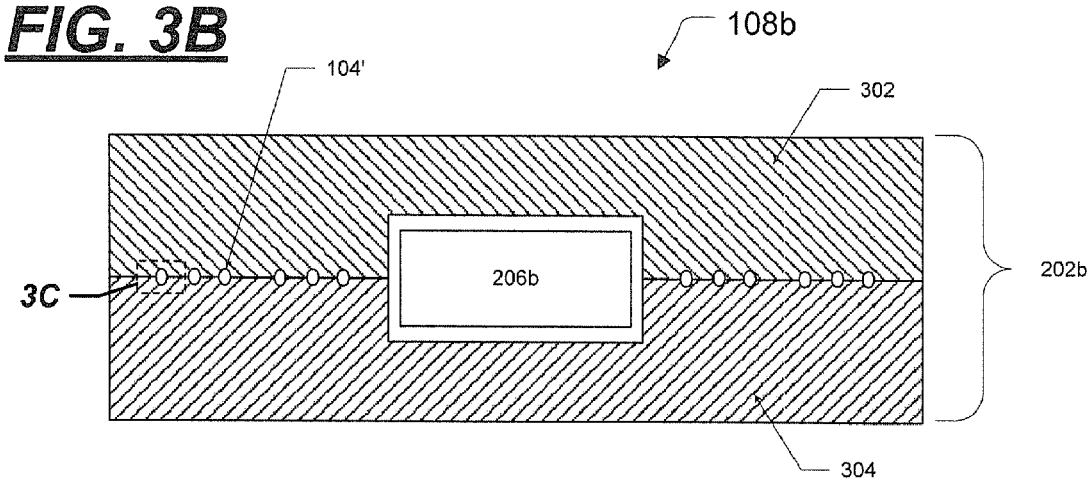
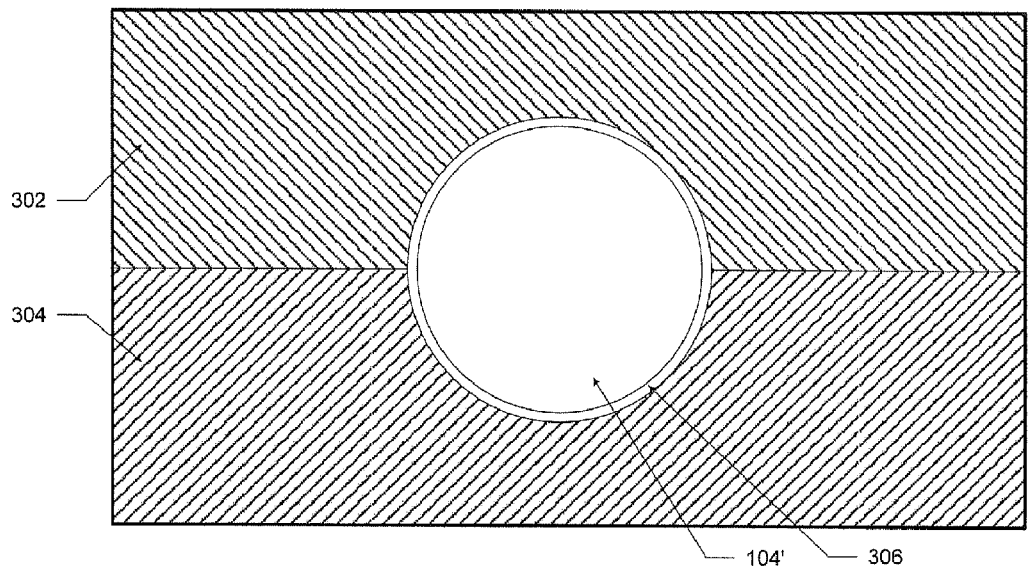

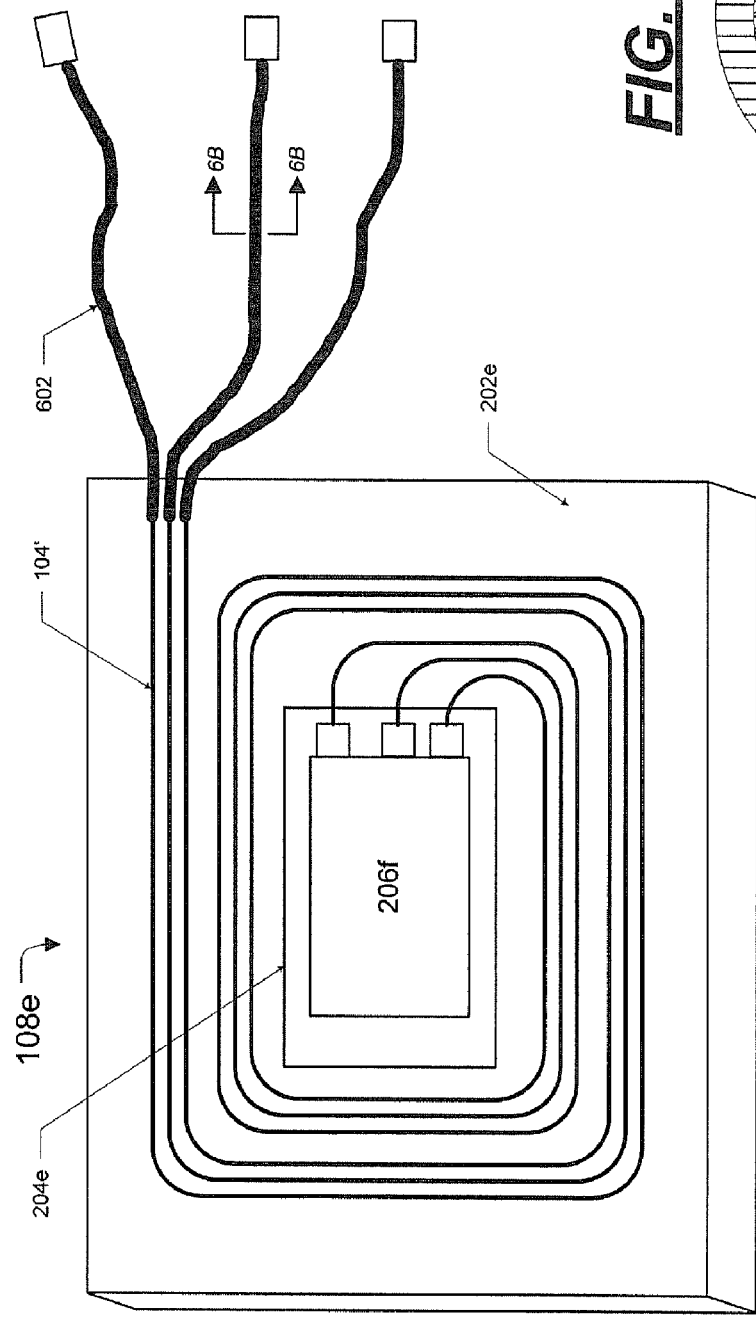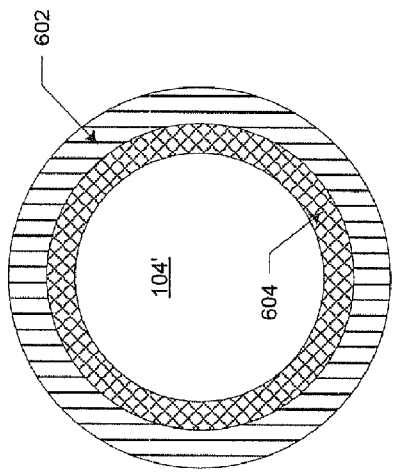

ENVIRONMENTALLY STABLE COMPONENT ASSEMBLY

BACKGROUND

Communication networks may extend across great distances. Accordingly, communication networks and components thereof, such as filters, signal processors, etc., are generally exposed to a variety of conditions, including weather and temperature extremes, and external contaminants such as moisture, dirt, etc., that may interfere with component operation. Fiber optic components such as filters, multiplexers, demultiplexers, etc., generally do not tolerate extended exposure to changing weather, especially extremely hot/cold or wet/dry weather, and must be protected from such conditions.

Historically, any concerns of exposure of network components to uncontrolled environmental conditions has been mitigated by housing components within maintenance and other facilities located throughout the network. Many contaminant-sensitive components of communication networks have thus been protected from damage resulting from external contaminants, weather, moisture, etc.

However, such facilities generally increase operational and maintenance costs of the network, and as such can be reduced in number or eliminated entirely. Accordingly, the contaminant and weather-sensitive components historically protected from external elements in these facilities must be made more resistant to weather and temperature variations, as well as contaminants that may be present, in the absence of the protection historically provided by larger network facilities.

Attempts to completely seal components within enclosures, such as hermetically sealing the components, have not proven robust for network applications, as these solutions are generally incapable of tolerating extreme conditions over long periods of time. Hermetically sealed components in particular may corrode as a result of the metallic materials generally employed in such applications, and are therefore not practical for applications where networks or portions thereof must be subjected to full immersion in water or other contaminants, e.g., in sewers, ditches, etc.

Accordingly, there is a need in the art for a network component, e.g., a fiber optic filter, which can generally withstand harsh operating conditions for extended periods of time.

BRIEF DESCRIPTION OF THE DRAWINGS

While the claims are not limited to the illustrated examples, an appreciation of various aspects is best gained through a discussion of various examples thereof. Referring now to the drawings, illustrative examples are shown in detail. Although the drawings represent the various examples, the drawings are not necessarily to scale and certain features may be exaggerated to better illustrate and explain an innovative aspect of an example. Further, the examples described herein are not intended to be exhaustive or otherwise limiting or restricting to the precise form and configuration shown in the drawings and disclosed in the following detailed description. Exemplary illustrations of the present invention are described in detail by referring to the drawings as follows.

FIG. 3B illustrates a section view of the optical component assembly shown in FIG. 3A;

FIG. 3C illustrates an enlarged portion of the section view shown in FIG. 3B;

FIG. 6A illustrates an elevated perspective view of an optical component assembly having protection jackets for exposed optical leads;

FIG. 6B illustrates a section view of an optical lead having a protection jacket shown in FIG. 6A.

DETAILED DESCRIPTION

Various examples of a component assembly for use to carry electrical or optical signals such as with communication system are disclosed. An exemplary component assembly may generally include a capsule defining a cavity for receiving an electrical or optical component. The component assembly may additionally include at least one lead extending from the component and through the capsule to allow communication between the component and a network or device, e.g., an exemplary communication network. The lead generally defines a sealed length along the capsule that may be at least as great as a predetermined or expected intrusion distance of an external contaminant along the sealed length over an expected lifetime or service interval associated with the component encapsulated in the cavity.

An exemplary method may generally include determining a service life of a component, providing a capsule for receiving the component, sealing at least one lead operable to allow communication between the component and a network or other device, e.g., an optical network, within the capsule to define a sealed length, and determining an intrusion distance of an external contaminant along the sealed length according to the service life of the component. The sealed length may be greater in magnitude than the determined intrusion distance.

Although component assemblies are illustrated as being part of a communication network, component assemblies can be used in conjunction with any network, system, device, etc., that generally employs at least one lead, wire, cable, connector, or other conduit for providing communication between a component and any other element, e.g., a network, system, device, or the like. Component assemblies described herein generally provide an environmentally stable packaging or capsule for one or more components contained therein that inhibit intrusion of external contaminants, and can limit contaminant intrusion to that along an interface between a lead extending between the component and the network, system, device, etc. Accordingly, although the component assemblies specifically described herein are illustrated as elements typically associated with communication networks (e.g., filters or processors), they may include any known electrical or optical device that is in wired communication with an adjacent component.

Figure 1:
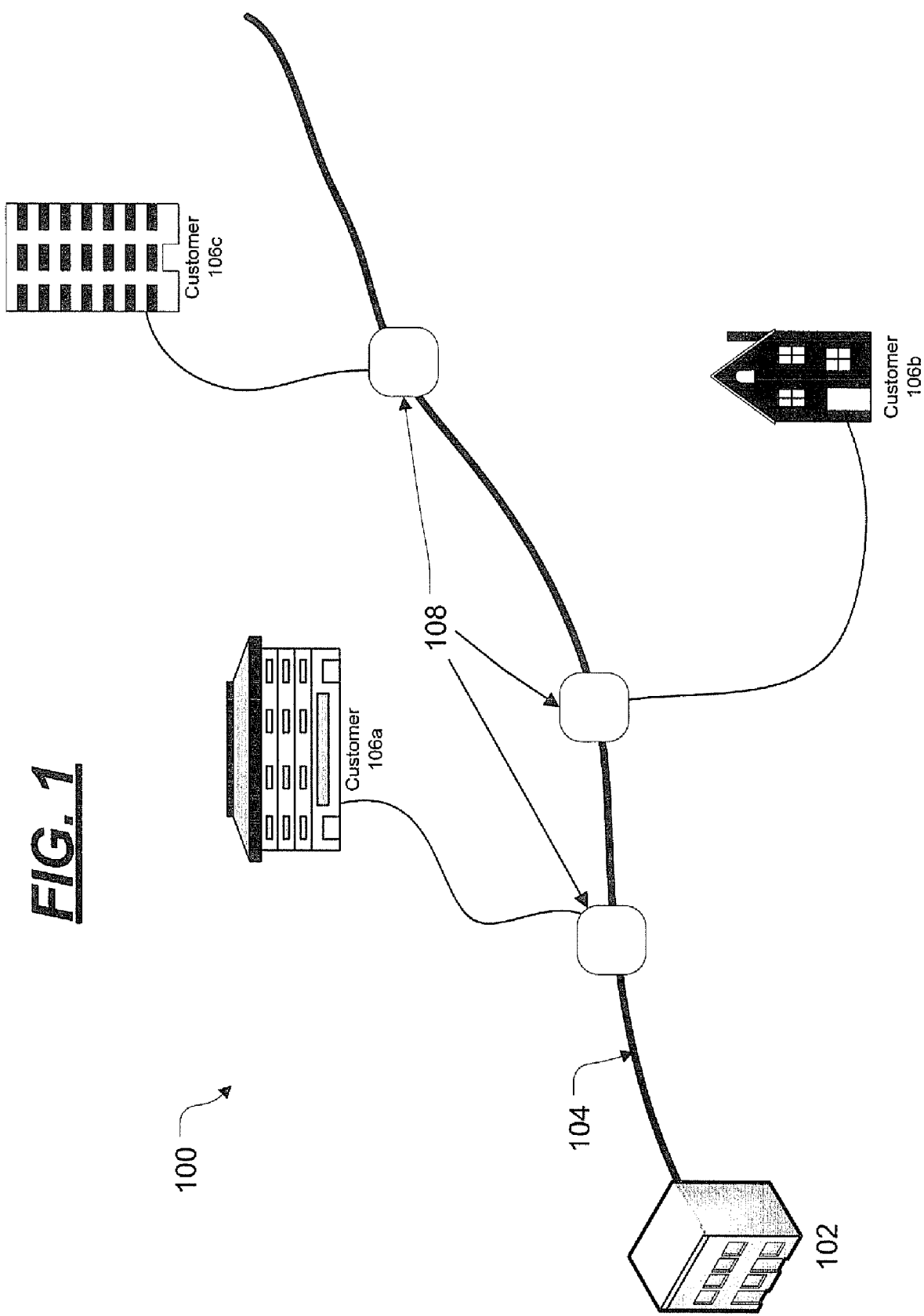
FIG. 1 illustrates an exemplary architecture of a communication system.

Turning now to FIG. 1, an exemplary communication system 100 is illustrated. System 100 generally includes a central office 102 and a communication line 104 that provides communication signals for a plurality of customers 106 in communication with the central office 102. System 100 may be in further communication with additional communications networks and/or systems, e.g., any known types of media distribution networks, packet-switched networks, telephone networks, or the like.

System 100 further includes a plurality of component assemblies 108 associated with a plurality of customer premises 106. Each component assembly 108 generally filters or demultiplexes signals transmitted through communication line 104 to provide a desired signal, e.g., media content, to or from an associated customer premise 106. Where system 100 is a fiber optic network, component assembly 108 may include any component that is convenient for generally filtering or processing signals transmitted through communication line 104 to customer(s) 106. For example, component assembly 108 may include a wavelength division multiplexing filter that is operable to generally receive an optical signal or data stream from communication line 104 and decode, i.e., demultiplex, the data stream to provide desired data, media content, etc., to a customer premise 106 associated with the component assembly 108. Central office 102 may thereby transmit multiple data streams to a plurality of customers at a single time.

Figure 2:
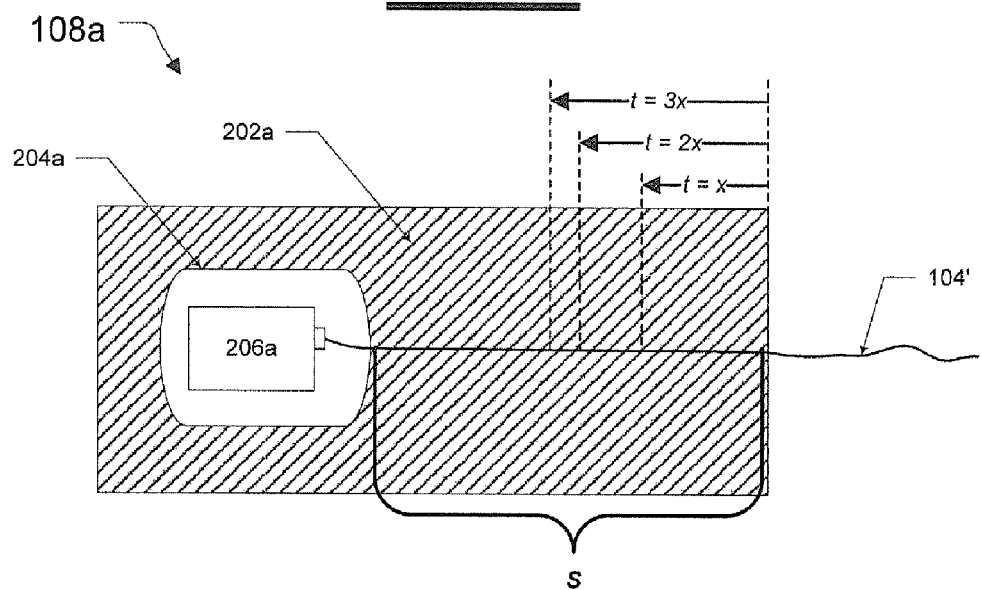
FIG. 2 illustrates a section view of an optical component assembly having a cavity for receiving an optical component.

Turning now to FIG. 2, a component assembly 108a is illustrated. Component assembly 108a generally includes a component 206a that is enclosed by a protective capsule 202a. Component assembly 108a may further include a lead 104' extending between component 206a and line 104 (not shown in FIG. 2). Although only one lead 104' is shown in FIG. 2, component assembly 108a may generally include a plurality of leads for allowing communication between component 206a and an adjacent component (e.g., line 104 or a customer premise 106), as may be necessary. For example, component 206a may have a first lead for receiving a data stream from main communication line 104, and a second lead for transmitting a processed or filtered data stream to an associated customer premise 106.

Capsule 202a may be any enclosure, housing or package that generally prevents intrusion of moisture, dirt or other contaminants, thereby protecting component 206a from damage or fouling that may result from exposure to such contaminants. For example, capsule 202a may be formed of plastic, glass, rubber, metal, resin, etc., or poly glass material, as further described below. Capsule 202a may define a cavity 204a for receiving component 206a. Additionally, cavity 204a can be defined by the material of capsule 202a displaced by component 206a during manufacturing or assembly of component assembly 108a. Examples of this can be hardening material formed around component assembly 108a during manufacturer that hardens once the assembly is in place. For example, a potting procedure using resins can be used to encapsulate component assembly 108a.

Lead 104' extends away from component 206a, and it can be sealed within capsule 202a to define a sealed length along capsule 202a. For example, as shown in FIG. 2, lead 104' defines a sealed length S. In an alternate embodiment, connectors (not shown) can be embedded in capsule 202a so as to provide a connective interface between the capsule and communication line 104. In this alternate embodiment, lead 104' would terminate at the connector, and communication line 104 would be attached, via connector, to the edge of the capsule 202a. Although undesirable, contaminants may typically intrude into cavity 204a along an interface between lead 104' and capsule 202a. Generally, it is difficult to entirely prevent intrusion of contaminants along the interface between lead 104' and capsule 202a without employing expensive materials or sealing structures. However, the rate of intrusion along the interface between lead 104' and capsule 202a may be generally controlled to reduce the rate of intrusion of external contaminants to a known rate, without necessarily sealing off intrusion entirely. Accordingly, moisture and/or contaminants may penetrate along lead 104' at a predetermined rate. The rate of an intrusion or penetration of external contaminants will generally depend upon a variety of factors, including material composition of capsule 202a and/or lead 104', inconsistencies in a cross-sectional path along lead 104' within capsule 202a and any gaps that may exist between capsule 202a and lead 104', etc.

The rate of intrusion by any external contaminant may thus generally be determined by a variety of factors, as described above. Typically, the rate of intrusion is a non-linear decreasing function, wherein the rate of intrusion gradually decreases over time. For example, as demonstrated in FIG. 2, an external contaminant may intrude along the sealed length of lead 104' over a time period represented by the letter x (t=x). Over time, the rate of intrusion may generally decrease. For example, as represented schematically in FIG. 2, over a first time period x, an external contaminant may intrude along lead 104' a given distance. Over a time period twice as long, denoted by 2x, the external contaminant intrudes at a decreased rate, such that the intrusion distance associated with time period x is greater than the difference in overall intrusion distance between time period x and 2x. In other words, contaminants may intrude a given distance over a first time period, but may only intrude twice the given distance over a much longer time period. While non-linear decreasing functions are generally typical of applications specifically described herein, other functions may describe intrusion of external contaminants along the interface between lead 104' and capsule 202 according to factors described herein.

An intrusion rate or function associated with a particular interface between lead 104' and capsule 202a may thus be determined from a consideration of the various factors described above. Lead 104' can be sealed within capsule 202a to define a sealed length S that is greater than an expected intrusion of any external contaminant over a service interval expected of component 206a. Accordingly, cavity 204a and component 206a remain free of contaminants over the lifetime or service interval of the component 206a. Component assembly 108a thereby generally provides a robust component assembly that resists malfunction or fouling as a result of external contaminants over an expected service interval or lifetime of component 206a.

Figure 3A:
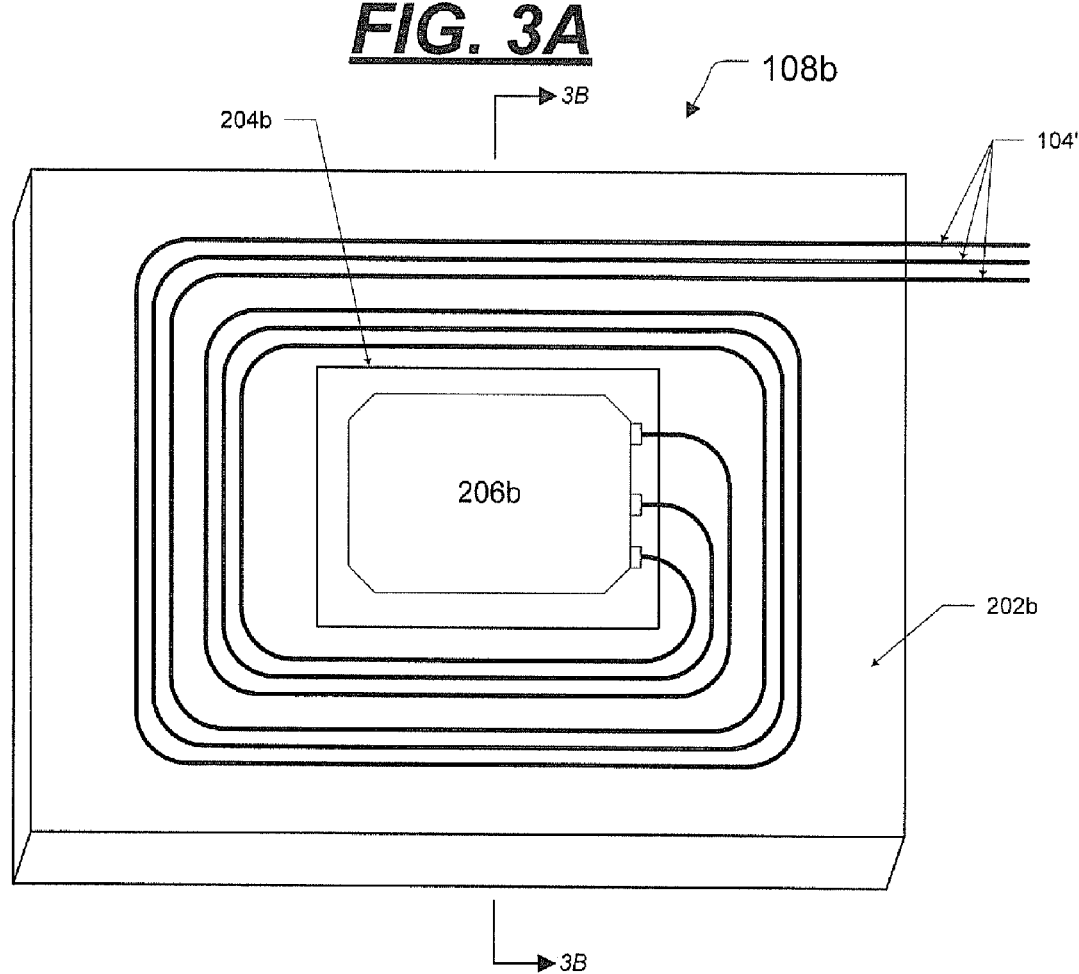
FIG. 3A illustrates an elevated perspective view of an optical component assembly having a plurality of optical leads encircling a cavity for receiving an optical component.

Turning now to FIG. 3A, a component assembly 108b is illustrated. Component assembly 108b includes a capsule 202b that defines a cavity 204b for receiving a component 206b. Component assembly 108b further includes a plurality of leads 104' that are sealed within capsule 202b such that leads 104' generally extend about a perimeter of component 206b and cavity 204b. In other words, leads 104' may be "wrapped" about component 206b and cavity 204b. Accordingly, a sealed length defined by an interface between leads 104' and capsule 202b may be substantially increased while maintaining a relatively compact overall package size of component assembly 108b.

Turning now to FIG. 3B, a section view of component assembly 108b is illustrated. As described above, component assembly 108 may generally be provided with a capsule 202b that generally prevents intrusion of external contaminants. For example, as shown in FIG. 3B, component assembly 108b may generally be assembled by placing an upper half 302 formed of a poly glass material in contact with a lower half 304, also formed of a poly glass material. Each of upper half 302 and lower half 304 may then be bonded together, generally sealing component 206b within cavity 204b, and further sealing lead 104' within capsule 202b. Upper half 302 and lower half 304 may be bonded or joined by any known process that seals the interface between upper half 302 and lower half 304, thereby generally preventing intrusion of any external contaminants along the interface between upper half 302 and lower half 304. For example, upper half 302 and lower half 304 may be joined by any seamless sealing process as is typically known, such as adhesive, resins, heat sealing, radiation sealing, etc.

Turning now to FIG. 3C, component assembly 108b is shown including an optional buffer material 306 disposed about lead 104'. Buffer material 306 may be any material that may provide improved resistance to intrusion along a sealed length of lead 104'. Buffer material 306 can be less rigid than the material forming capsule 202b, and can have a thermal expansion coefficient that is between that of lead 104' and capsule 202b. Buffer material 306 thus generally minimizes fluctuations in any gap between lead 104' and capsule 202 that may exist long the sealed length of lead 104'. Accordingly, buffer material 306 may provide increased resistance to intrusion by an external contaminant along a sealed length of lead 104' across a range of temperature extremes. Additionally, buffer material 306 can be configured so that it does not interfere with the function of lead 104', e.g., transmission of signals, data, or the like.

Figure 4:
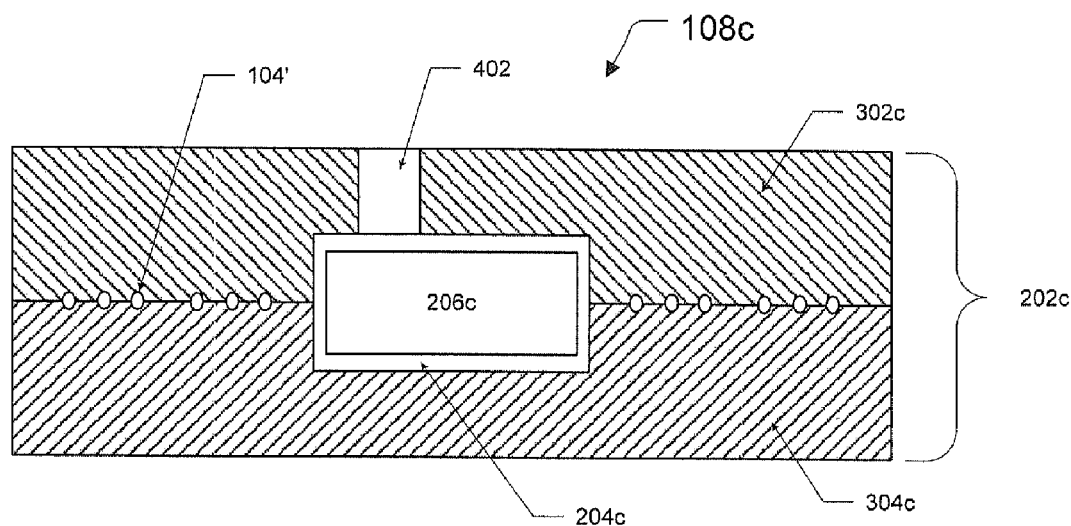
FIG. 4 illustrates a section view of an optical component assembly having an aperture for pressurization of a cavity for an optical component.

Turning now to FIG. 4, another example of component assembly 108c is illustrated. Component assembly 108c includes an upper half 302c and a lower half 304c of capsule 202c. The upper half 302c and lower half 304c cooperate to define a cavity 204c for receiving a component 206c. Lead 104' may be sealed within capsule 202 such that lead 104' extends about cavity 204c and component 206c substantially as described above. Upper half 302c of capsule 202c includes an aperture 402 extending between cavity 204c and an external surface of capsule 202c, thereby allowing for fluid communication between cavity 204c and the external atmosphere. Aperture 402 may be employed as a conduit for pressurizing cavity 204c. For example, cavity 204c may be pressurized by forcing a gas through aperture 402 to generally raise a pressure within cavity 204c above atmospheric pressure. Pressurization of cavity 204c above ambient atmospheric pressure may generally increase an ability of lead 104' and capsule 202c to resist intrusion of an external contaminant along lead 104'. Cavity 204c may be pressurized with any gas or substance that is convenient. For example, an inert gas may be employed for pressurizing cavity 204c, such that pressurization of cavity 204c does not introduce any reactive elements that could possibly cause interference or corrosion of component 206c, into cavity 204c. After cavity 204c is pressurized, aperture 402 may be sealed or plugged, thereby maintaining the increased pressure of cavity 204c. Merely by way of example, cavity 204c may be pressurized with nitrogen gas ($N_2$) to approximately at least 1.1 atmospheres (atm).

Figure 5:
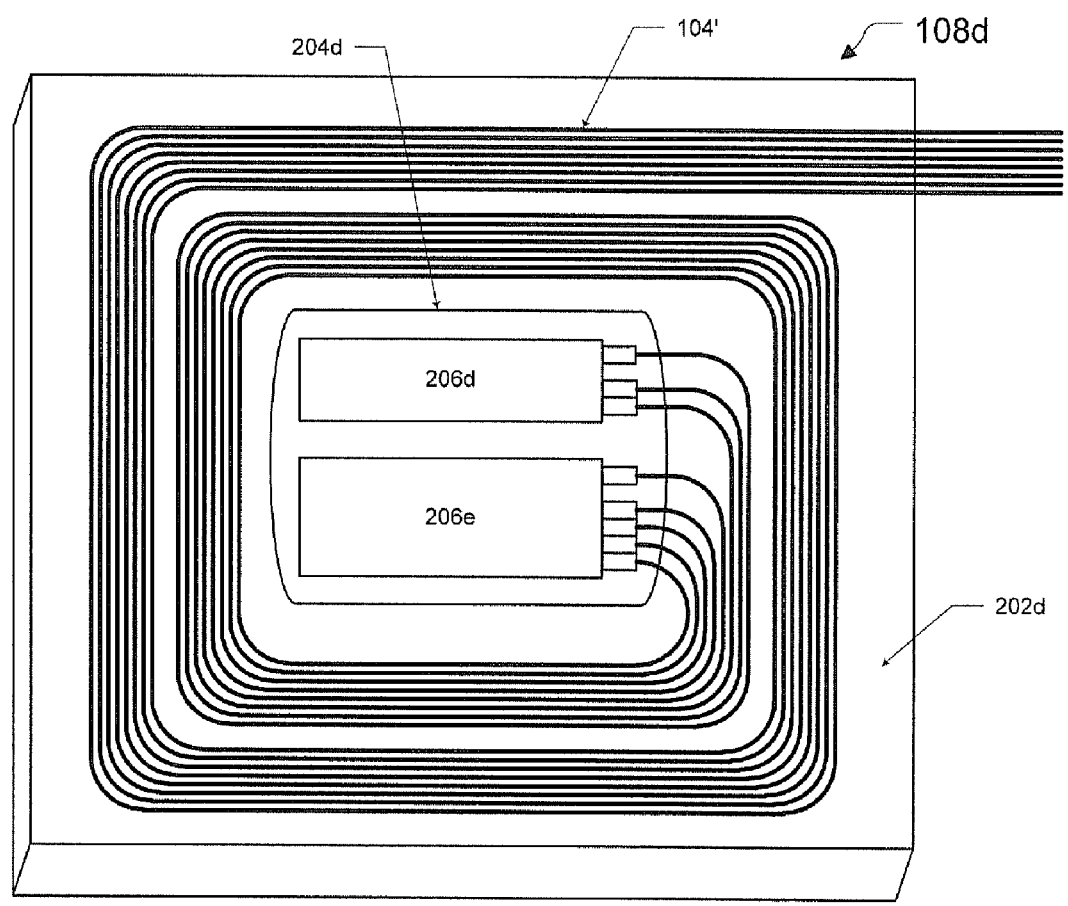
FIG. 5 illustrates an elevated perspective view of an optical component assembly having a plurality of optical components contained in a cavity.

Component assembly 108 may be provided with two or more components. For example, as shown in FIG. 5, component assembly 108d includes two components 206d and 206e. Component assembly 108d may include fiber optic leads that are wrapped about cavity 204d and components 206d and 206e substantially as described above. Accordingly, component assembly 108 may include any number of components 206 that is convenient.

Turning now to FIGS. 6A-6B, another example of a component assembly 108 is illustrated. Component assembly 108e includes a capsule 202e which defines a cavity 204e for receiving a component 206f. Leads 104' are generally wrapped about cavity 204e and component 206f, substantially as described above. Additionally, leads 104' are each disposed with a protection jacket 602 which generally surrounds and protects leads 104' outside of capsule 202e, as may be useful in applications where lead 104' is particularly delicate or sensitive to environmental factors, e.g., fiber optic applications. Protection jacket 602 may include any material or coating for generally protecting lead 104' from external contaminants and/or an externally applied force, e.g., due to shock, jarring, vibration, bending, handling, etc. Lead 104' may further include an intermediate layer 604 that is disposed immediately around lead 104' for protecting lead 104' from handling, e.g., fingerprints or other damage that may occur during assembly of fiber optic component assembly 108e. For example, intermediate layer 604 may include a polymer coating. Accordingly, protection jacket 602 generally protects lead 104' and intermediate layer 604 from damage that may occur during assembly, shipment, or use of component assembly 108e.

Figure 7:
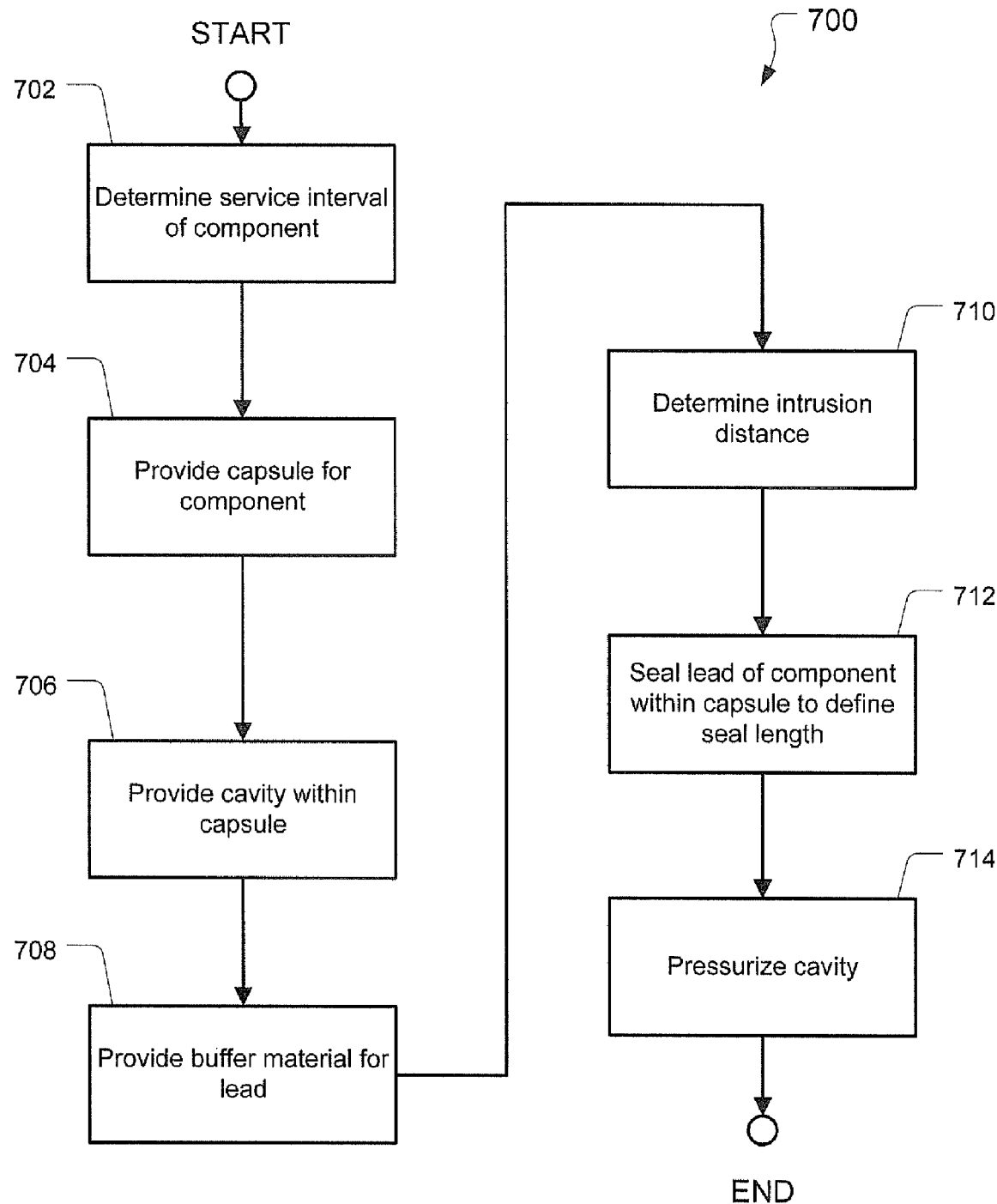
FIG. 7 illustrates an exemplary process for assembling an optical component.

Turning now to FIG. 7, a process 700 for assembling a component assembly 108 is illustrated. Process 700 may begin at step 702, where a service interval of component 206 is determined. For example, a service interval of component 206 may be an expected lifetime or maintenance interval of a communications component, e.g., a wavelength division multiplexing filter for a fiber optic communication network. Process 700 may then proceed to step 704.

In step 704 a capsule 202 is provided for component 206. For example, as described above, a capsule 202 may be provided that generally resists intrusion of external contaminants. Capsule 202 may be formed of any material and by any process that is convenient. Process 700 may then proceed to step 706.

In step 706, a cavity 204 is provided within capsule 202. For example, cavity 204 may be integrally formed within an upper half 302 and/or a lower half 304 of capsule 202. Process 700 may then proceed to step 708, which is an example of an optional step. In embodiments not including step 708, process 700 may proceed directly to step 710.

In step 708, a buffer material 306 may be provided for lead 104'. For example, as described above, a buffer material 306 may be provided that generally increases resistance of component assembly 108 to intrusion by a external contaminant along lead 104'. While any buffer material 306 may be employed, a buffer material 306 may advantageously have a thermal expansion coefficient generally between that of capsule 202 and lead 104'. Process 700 may then proceed to step 710.

In step 710, an intrusion distance is determined. For example, as described above, various factors such as the nature of an interface between lead 104' and capsule 202, a particular external contaminant, etc., may used in determining a rate of intrusion or a function generally associated with the intrusion along lead 104'. Furthermore, the intrusion distance may be determined according to a desired service interval or lifetime of a component disposed within a component assembly. Process 700 may then proceed to step 712.

In step 712, a lead 104' of component 206 is sealed within capsule 202 to define a sealed length. The sealed length can be at least as great as an intrusion distance determined in step 710. Accordingly, despite intrusion of external contaminants along a lead 104', external contaminants will generally be prevented from reaching component 206 during an expected service interval or lifetime associated with component 206. Process 700 may then proceed to step 714.

In step 714, cavity 204 of component assembly 108 may be pressurized. For example, a resistance of component assembly 108 to intrusion by external contaminants may be increased by pressurizing cavity 204 above atmospheric pressure. For example, cavity 204 may be pressurized through an aperture 402 with an inert gas, such an nitrogen, to an atmospheric pressure of 1.1 to 1.2 atmospheres, thereby generally increasing resistance of component assembly 108 to intrusion by an external contaminant along a sealed length associated with lead 104'. Process 700 may then terminate.

Accordingly, component assembly 108 and process 700 generally allow for protection of various components from contaminant intrusion over a lifetime or service interval of the components, while not requiring elaborate or expensive sealing materials or procedures.

Reference in the specification to "one example," "an example," "gone embodiment," or "an embodiment" means that a particular feature, structure, or characteristic described in connection with the example is included in at least one example. The phrase "in one example" in various places in the specification does not necessarily refer to the same example each time it appears.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A communication system, comprising:
   a line operable to provide a signal; and
   a component assembly associated with said line, including:
      a capsule material displaced by a component defining a cavity in said capsule material, said capsule material rigidly-formed around said component;
      at least one lead having a length extending from said component through said capsule material, thereby forming a sealed interface between surface of said lead and said capsule material over said length of said lead, said lead allowing communication between said component and said line, said lead defining a sealed length within said capsule material, said sealed length extending from said component to an exterior surface of said capsule material;
      wherein said sealed length is at least as great as an expected intrusion distance of an external contaminant along said sealed length over an expected service life of said component.

2. The communication system of claim 1, wherein said capsule material is operable to generally seal said component from the external contaminant and generally permit intrusion of the external contaminant along said sealed length at a predetermined intrusion rate and wherein said capsule material is selected from a group of capsule materials consisting of plastic, glass, rubber, metal, resin and polyglass.

3. The communication system of claim 1, wherein said cavity is pressurized above atmospheric pressure.

4. The communication system of claim 3, wherein said cavity is pressurized with an inert gas.

5. The communication system of claim 1, further comprising a buffer material disposed about said at least one lead along at least a portion of said sealed length, said buffer material is a material having a thermal expansion rate that is one of greater than and less than a thermal expansion rate of the lead and the other of greater than and less than a thermal expansion rate of the capsule material.

6. The communication system of claim 1, wherein said component is a wavelength-division multiplexing filter.

7. A component assembly, comprising:
   a capsule material displaced by a component defining a cavity in said capsule material, said capsule material rigidly-formed around said component;
   and
   at least one lead having a length extending from said component through said capsule material, thereby forming a sealed interface between surface of said lead and said capsule material over said length of said lead, said lead allowing communication between said component and an optical network, said lead defining a sealed length within said capsule material, said sealed length extending from said component to an exterior surface of said capsule material;
   wherein said sealed length is at least as great as an expected intrusion distance of an external contaminant along said sealed length over an expected service life of said component.

8. The component assembly of claim 7 wherein said capsule material is operable to generally seal said component from the external contaminant and generally permit intrusion of the external contaminant along said sealed length at a predetermined intrusion rate.

9. The component assembly of claim 7, wherein said cavity is pressurized above atmospheric pressure.

10. The component assembly of claim 7, wherein said cavity is pressurized with an inert gas.

11. The component assembly of claim 7, further comprising a buffer material disposed about said at least one lead along at least a portion of said sealed length, said buffer material having a thermal expansion rate that is one of greater than and less than a thermal
   expansion rate of the lead and the other of greater than and less than a thermal expansion rate of the capsule material.

12. The component assembly of claim 7, wherein said component is a wavelength-division multiplexing filter.

13. A method, comprising:
   determining a service interval of a component having at least one lead operable to allow communication between said component and an optical network;

encapsulating said component and said at least one lead in a capsule material that hardens as it forms-around and conforms to exterior surfaces of said component and said at least one lead;

sealing, by operation of said encapsulating, at least one lead of said component within said capsule material to define a sealed length, said sealed length exceeding a minimum length and extending from said component to an exterior surface of said capsule material; and determining that an intrusion distance of an external contaminant along said sealed length during said service interval is less than said minimum length.

14. The method of claim 13, wherein said intrusion distance is determined according to at least an intrusion rate of said external contaminant along said sealed length.

15. The method of claim 14, establishing said intrusion rate as a non-linear function that decreases over time.

16. The method of claim 13, determining said intrusion distance according to at least one of a material composition of said at least one lead, a material composition of said capsule material, and a gap between said at least one lead and said capsule material along said sealed length.

17. The method of claim 13, further comprising sealing said component from said external contaminant within said capsule material, wherein said external contaminant intrudes generally only along said sealed length at a predetermined rate.

18. The method of claim 13, further comprising modifying said encapsulating to encapsulate a cavity within said capsule material and receiving said component in said cavity of said capsule material; and pressurizing said cavity above atmospheric pressure.

19. The method of claim 18, further comprising pressurizing said cavity with an inert gas.

20. The method of claim 13, further comprising providing a buffer material about said at least one lead along at least a portion of said sealed length, said buffer material having a thermal expansion rate that is one of greater than and lesser than a thermal expansion rate of the lead and the other of greater than and lesser than a thermal expansion rate of the capsule material.

21. The method of claim 13, wherein said component is a wavelength-division multiplexing filter.

22. A technique for protecting a component subjected to harsh operating conditions, comprising:

providing a capsule having an interior surface and an exterior surface, said exterior surface interfacing with said harsh operating conditions;

providing a protective cavity within said capsule, said cavity forming said interior surface conforming to exterior surface of said component;

at least partially encircling said component in a path lying between said interior surface of said capsule and said exterior surface of said capsule by at least one lead operatively connected from said component, said encircling being continued until at least a predetermined length of said lead is sealed by said capsule before said lead exits said exterior surface of said capsule; and applying positive atmospheric pressure to said cavity;

whereby said pressure is applied along said path and along an interface created by said seal between said lead and said capsule to slow movement of any intruding contaminant moving along said path within said interface towards said component.

23. The technique of claim 22 wherein said predetermined length and said pressure are selected to permit said component to achieve its expected service life before being impacted by said intruding contaminant from said exterior surface of said capsule moving along said path toward said component.

24. The technique of claim 22 wherein said component is an electronic component or an optical component.

25. The technique of claim 22 wherein material of said capsule is selected from the group of materials consisting of plastic, glass, rubber, resin, poly-glass and metal.

26. The technique of claim 22 wherein said applying positive atmospheric pressure to said cavity utilizes an inert gas.

27. The technique of claim 26 wherein said inert gas is nitrogen.

* * * * *